United States Patent
Chabot et al.

(10) Patent No.: US 6,370,818 B1
(45) Date of Patent: Apr. 16, 2002

(54) PROTECTION DEVICE FOR TUBULAR CONDUITS OF A SAP COLLECTING SYSTEM

(75) Inventors: Jean-Marie Chabot, St-Damien; Alain Fournier, Honfleur, both of (CA)

(73) Assignee: Les Equipments d'Erabliere CDL, Inc. (CA)

( * ) Notice: Subject to any disclaimer, the term of this patent is extended or adjusted under 35 U.S.C. 154(b) by 0 days.

(21) Appl. No.: 09/593,247

(22) Filed: Jun. 13, 2000

(51) Int. Cl.[7] .............................................. A01G 23/10
(52) U.S. Cl. ........................................................... 47/50
(58) Field of Search ............................... 47/51, 52, 53, 47/54, 50; 285/114, 116

(56) References Cited

U.S. PATENT DOCUMENTS

| | | | | |
|---|---|---|---|---|
| 1,186,741 A | * | 6/1916 | Brower | 285/189 |
| 2,877,601 A | * | 3/1959 | Griggs | 47/52 |
| 3,156,069 A | * | 11/1964 | Lamb | 47/51 |
| 5,005,314 A | * | 4/1991 | Chabot | 47/50 |
| 5,054,820 A | | 10/1991 | Lesquir et al. | |
| 5,224,289 A | * | 7/1993 | Buzzell | 47/52 |
| 5,303,504 A | * | 4/1994 | Buzzell | 47/52 |

* cited by examiner

*Primary Examiner*—Charles T. Jordan
*Assistant Examiner*—Jordan Lofdahl
(74) *Attorney, Agent, or Firm*—Ankerman Senterfitt

(57) ABSTRACT

A device for protecting the connection of a tubular conduit to a main tube of a maple sap collecting system wherein sap collected from maple trees are directed under vacuum to a pumping station of a sap processing center. The device comprises a band having a first end adapted to be mounted to the main tube and an opposite end adapted to be mounted externally onto the tubular conduit at a given distance from the main tube. This distance is greater than the distance between the first and opposite ends of the band so that accidental impact on the tubular conduit resulting from falling objects and tension applied to the attachment of the conduit to the main tube are taken by the band to thereby protect the connection of the tubular conduit to the adapter.

10 Claims, 3 Drawing Sheets

PROTECTION DEVICE FOR TUBULAR CONDUITS OF A SAP COLLECTING SYSTEM

FIELD OF THE INVENTION

The present invention relates to a device for protecting the connection of a tubular conduit to a main tube of a maple sap collecting system wherein sap collected from maple trees are directed under vacuum to a pumping station of a sap processing center.

BACKGROUND OF THE INVENTION

Sap from maple trees is collected first by a tree tapping device connected to a drop tube fitted to a tubular conduit, the opposite end of which is connected to a main collecting tube which directs the collected sap under vacuum to a sap processing center. An adapter is mounted to the main tube to enable the connection of the tubular conduit to the main tube; the adapter has a part connected to the opposite end of the tubular conduit and has an inner portion penetrating the main tube allowing the sap received from the tubular conduit to flow into the main tube. One example of such adapter is described in applicant's U.S. Pat. No. 5,054,820 issued Oct. 8, 1991.

Since this type of assembly for collecting sap from trees and for directing it to a central processing station is not removed from its location during the months outside the sap collecting season, it is therefore subject throughout the year to various types of impacts, such as for example branches falling from trees. Frequently, whenever such impact occurs on the tubular conduit, there is disconnection of the tubular conduit from the adapter mounted on the main tube. Also, the tubular conduit is made from a flexible thermoplastic resin and this conduit must be stretched from the main tube to the first maple tree to maintain it straight. This stretching creates a tension to the connection and could affect the tightening of the connector to the main tube under vacuum.

Various types of systems have been provided to overcome this problem, one of which is to provide a protection device wherein one end is mounted to the main tube and the opposite end is mounted to the tubular conduit. However, in this case as well as other cases, the tubular conduit must be sectioned so that each sectioned end of the conduit may be mounted to a conduct connecting part of the protection device.

An important problem associated with sectioning tubular conduits is that the conduit connecting parts of the protection device must penetrate into the sectioned end of the tubular conduits. The connection is of the "slide-in" type where the conduit connecting part of the protection device is inserted within the tubular conduit; hence, the inner diameter of the conduit connecting part is smaller than the inner diameter of the tubular conduit. This diameter constriction limits the flow of sap to the main tube as it affects the level of vacuum in the system, i.e., if vacuum is low, the sap collection is diminished.

OBJECTS AND STATEMENT OF THE INVENTION

It is an object of the present invention to overcome the above described problems associated with present systems of protecting the connection of a tubular conduit to a main tube; this is achieved by eliminating the necessity of requiring the tubular conduit from being sectioned and by providing a protecting device wherein one end is mounted to the main tube and the opposite end encircles the tubular conduit thus avoiding sectioning the tubular conduits.

The present invention therefore relates to a device for use in a maple sap collecting system using a main tube for collecting sap from tubular conduits and directing the sap to a pumping station of a sap collecting center wherein the tubular conduits are uninterrupted with one end connected to tree taping means and an opposite end mounted to an adapter for connection to the main tube whereby sap collected from a maple tree is conducted through the tubular conduit directly to the main assembly. The device comprises a band having a first end adapted to be mounted to the main tube and an opposite second end adapted to be mounted externally to the tubular conduit at a distance from the main tube; this distance is greater than the distance between the first and second ends of the band whereby accidental impact on the tubular conduit resulting from falling objects is taken by the band to thereby protect the connection of the tubular conduit to the adapter. The invention creates a loop thus avoiding any tension on the tubular conduit in the connection area.

In one preferred form of the said invention, the opposite end of the band comprises an extension which is foldable to define a loop to surround or envelop externally the tubular conduit.

In another form of the invention, the extension is provided with friction means to provide anti-sliding between the tubular conduit and the band.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
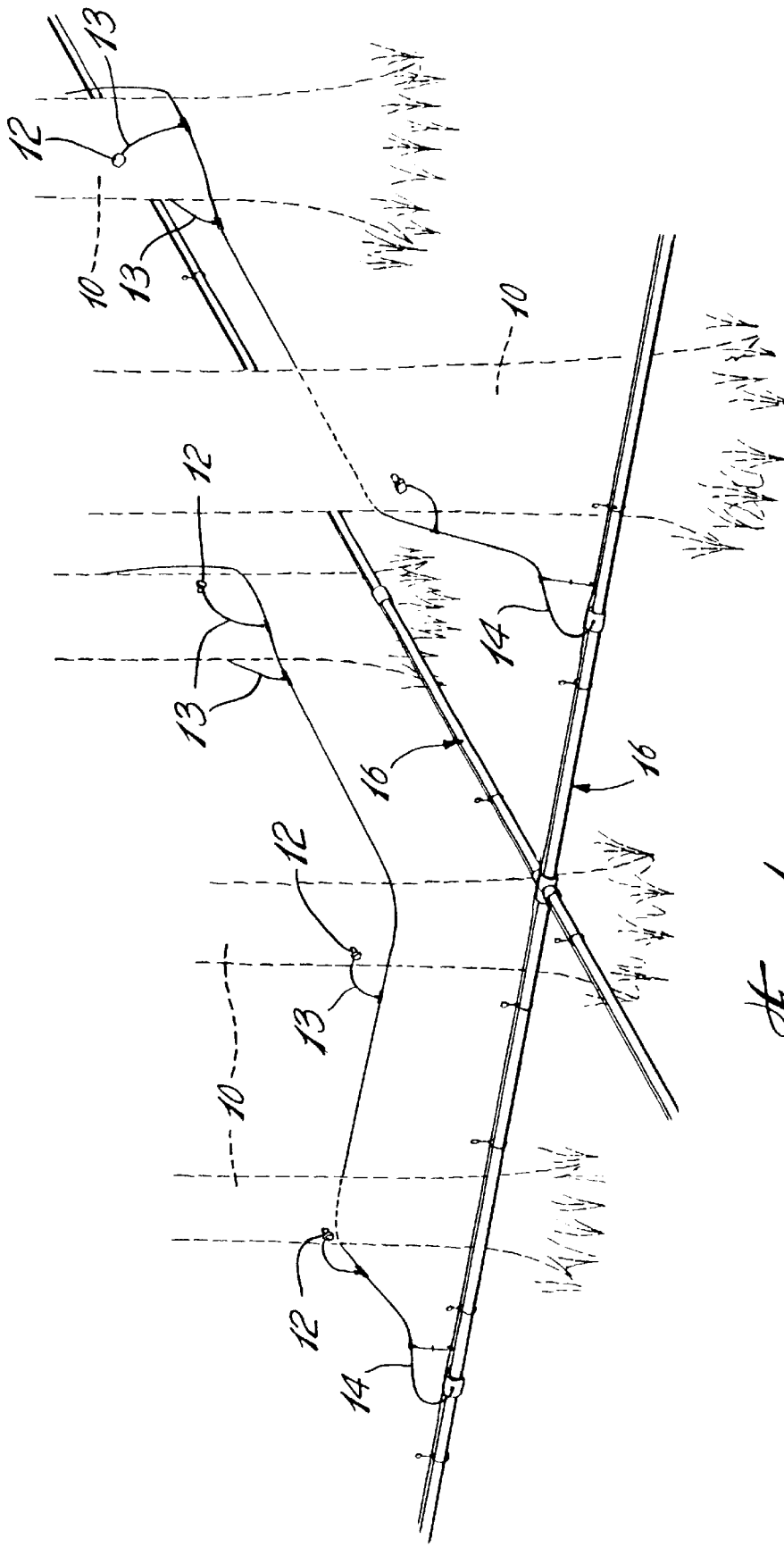
FIG. 1 shows an arrangement of main tubes with tubular conduits mounted to maple trees.

As shown if FIG. 1, sap from maple trees 10 is collected first by means of tree tapping means consisting of tree tapping devices 12 and drop tubes 13 wherein device 12 has one end penetrating the outer layers of maple trees and an outer end engaged to the drop tube 13 fittingly connected to a tubular conduit 14. An opposite end of the tubular conduit is mounted to a main tube 16. The sap from the maple trees is pumped under vacuum and are brought by the main tubes 16 to the pumping station of a sap processing center (not shown).

Usually, there are one or two drop tubes at each maple tree while a tubular conduit may collect sap from the drop tubes of five or six maple trees. The tubular conduits are usually parallel to ground and, in most cases, they are stretched or under tension.

Figure 2:
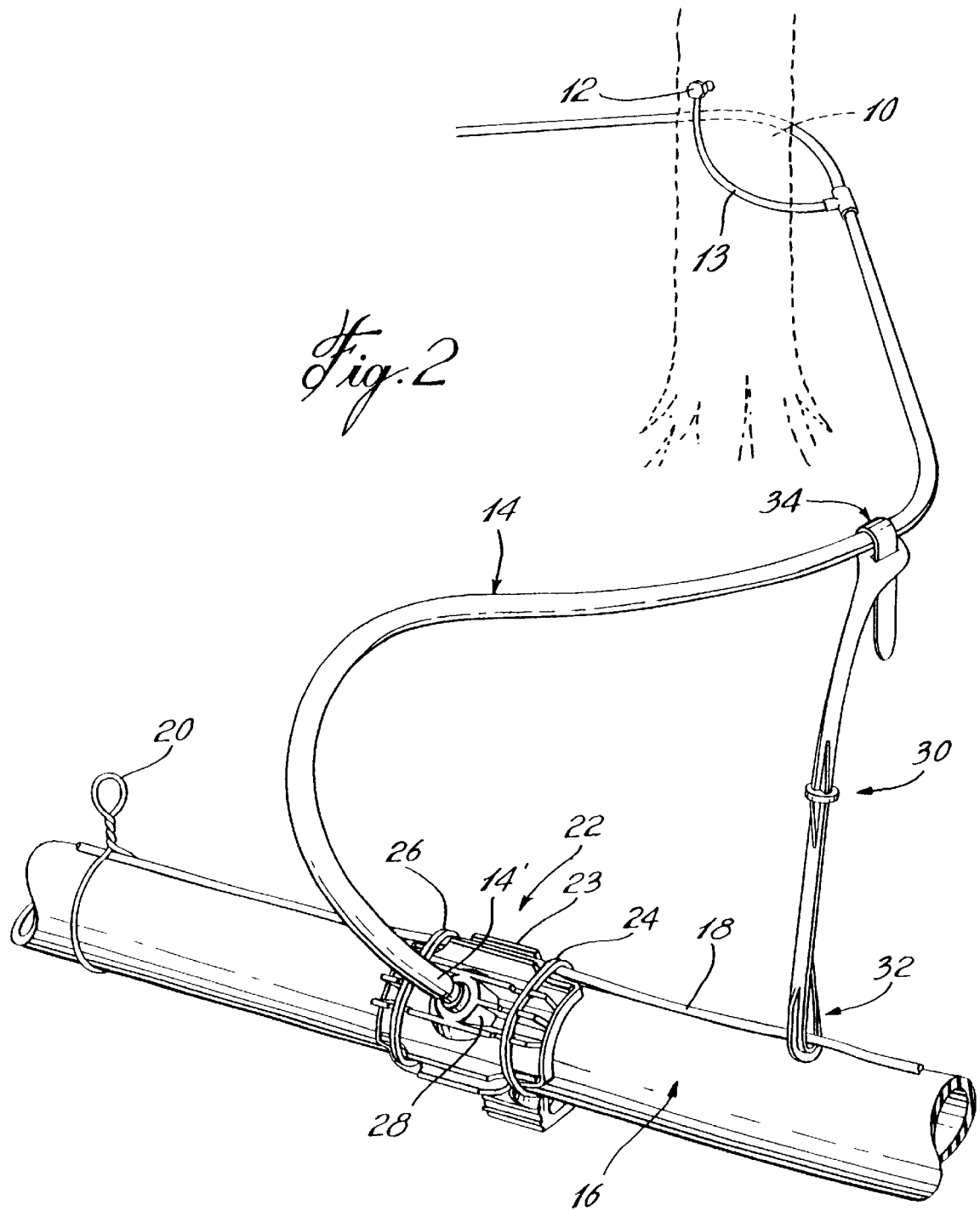
FIG. 2 is a perspective view showing a device made in accordance with the present invention for the protection of a main tubular conduit to a main tube.

As can be seen in FIG. 1, the assembly of tapping devices 12, drop tubes 13, tubular conduits 14 and main tubes 16 extends above ground; this installation is permanent throughout the year even though the maple collecting season is relatively short. This network of tubes and conduits above ground is secured by means of support wires 18 (see FIG. 2) not shown in 2 which extends longitudinally along the main tubes and secured thereto by means of a plurality of wire connections 20.

An adapter 22 is mounted to the main tube for connecting the end 14' of the tubular conduit to the main tube. As stated above, one example of such adapter may be found described in applicant's issued patent U.S. Pat. No. 5,054,820, hence, a description of its construction needs not be detailed. This adapter 22 has a portion 23 that receives the support wire 18 and is fixedly attached to the tube 16 by means of connecting wires 24 and 26. The adapter 22 has a central portion 28 adapted to connect the end 14' of the tubular conduit; it also includes an inner part (not shown) extending inside the main tube 16 thus enabling the sap received from the tubular conduit 14 to be directed to the pumping station of the sap processing center.

Since the installation of this sap collecting assembly remains in place all year around, the tubular conduits 14 which are under tension to keep them as straight as possible are subject to impacts, mainly resulting from falling tree branches. It is therefore a well known practice in the sap industry to provide some protection device for the connection of the tubular conduit end 14' to the adapter 22.

The present invention is therefore concerned with an improved protection device 30 which consists mainly of a band made of flexible plastic resin material with a first end 32 mounted to the main tube and an opposite end mounted to encircle the tubular conduit 14.

Figure 3:
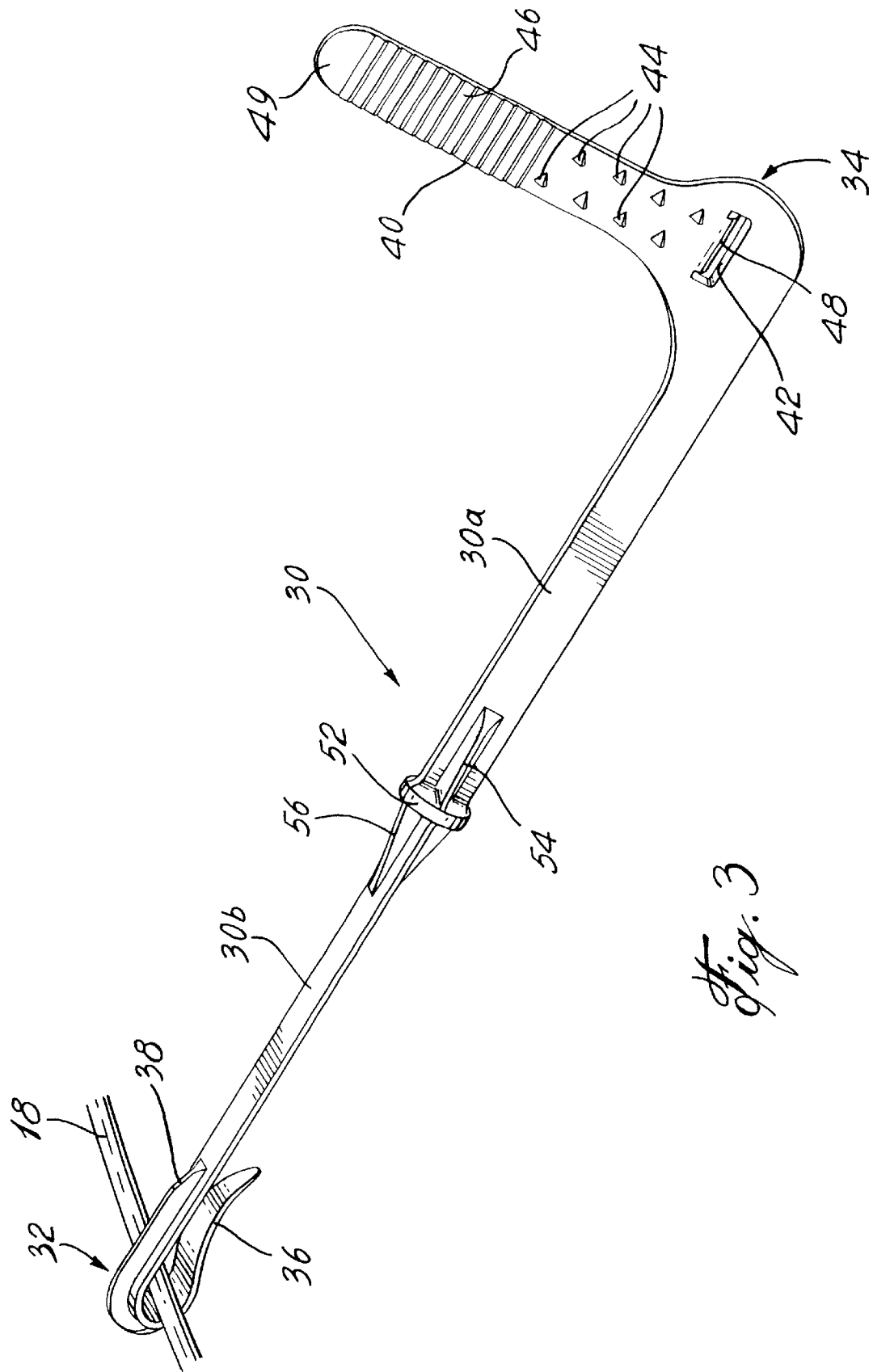
FIG. 3 is a perspective view of the protection device of the present invention.

Referring more particularly to FIG. 3, the first end 32 of the band 30 defines a hook type configuration with one portion 36 folded in close proximity to an opposite portion 38 thus leaving a small gap therebetween so as to enable a snap-type engagement onto the support wire 18. The opposite end 34 of the band 30 comprises an extension 40 and displays a slot 42. The inner face of the extension 40 displays a series of small projections 44 will sharp edges that provide friction means when the band 34 is mounted externally onto a tubular conduit.

To secure the mounting of the band, section 40 onto the tubular conduit, the inner face of the extension 40 is also provided with a series of ridges 46 that interlock with a cooperating projection 48 in the slot 42 so that when the extension 40 is folded to define a loop and end 49 is inserted in the slot an adjustable interlocking arrangement is obtained between the band and the tubular conduit and friction means 44 prevent the band from sliding along the tubular conduit.

In the embodiment illustrating FIG. 3, the central portion of the band 30 comprises enlarged portions 52, 54 and 56 to increase the connection of section 32*a* to 32*b* which are at 90° angle relative to one another.

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed is:

1. In a maple sap collecting system using a main tube for collecting sap from tubular conduits and directing sap to a central sap pumping station, said tubular conduits being uninterrupted between one end connected to tree tapping means and a second end mounted to an adapter for connection to said main tube whereby sap collected from a maple tree is pumped through said tubular conduit and through said main assembly to said pumping station, a device for protecting the connection of said tubular conduit to said main tube comprising:

a band having a first end adapted for mounting to said main tube and an opposite second end adapted for mounting externally to said tubular conduit at a given distance from said main tube;

said distance being greater than the distance between said first and said second ends of said band whereby accidental impact on said tubular conduit resulting from falling objects and tension on the tubular conduit are taken by said band to thereby protect said connection of said tubular conduit to said adapter;

said main tube including a support wire longitudinally extending therealong and fixedly mounted to said tube, said first end of said band being engaged to said support wire.

2. In a sap collecting system as defined in claim 1, wherein said first end of said band defines an opened loop snappingly engageable with said wire.

3. In a maple sap collecting system using a main tube for collecting sap from tubular conduits and directing sap to a central sap pumping station, said tubular conduits being uninterrupted between one end connected to tree tapping means and a second end mounted to an adapter for connection to said main tube whereby sap collected from a maple tree is pumped through said tubular conduit and through said main assembly to said pumping station, a device for protecting the connection of said tubular conduit to said main tube comprising:

a band having a first end adapted for mounting to said main tube and an opposite second end adapted for mounting externally to said tubular conduit at a given distance from said main tube;

said distance being greater than the distance between said first and said second ends of said band whereby accidental impact on said tubular conduit resulting from falling objects and tension on the tubular conduit are taken by said band to thereby protect said connection of said tubular conduit to said adapter;

wherein said opposite end of said band comprises an extension foldable to define a loop through which extends said tubular conduit, and said extension displays a slot into which is inserted one end of said extension to define said loop.

4. In a maple sap collecting system using a main tube for collecting sap from tubular conduits and directing sap to a central sap pumping station, said tubular conduits being uninterrupted between one end connected to tree tapping means and a second end mounted to an adapter for connection to said main tube whereby sap collected from a maple tree is pumped through said tubular conduit and through said main assembly to said pumping station, a device for protecting the connection of said tubular conduit to said main tube comprising:

a band having a first end adapted for mounting to said main tube and an opposite second end adapted for mounting externally to said tubular conduit at a given distance from said main tube;

said distance being greater than the distance between said first and said second ends of said band whereby accidental impact on said tubular conduit resulting from falling objects and tension on the tubular conduit are taken by said band to thereby protect said connection of said tubular conduit to said adapter;

wherein said opposite end of said band comprises an extension foldable to define a loop through which extends said tubular conduit, and said extension displays a slot into which is inserted one end of said extension to define said loop wherein said extension and said slot include interlocking means.

5. In a sap collecting system as defined in claim 1, wherein said second opposite end of said band mounted to said tubular conduit displays friction means thereon to provide anti-sliding of said band on said tubular conduit.

6. In a sap collecting system as defined in claim 1, wherein said band consists of a unitary body of flexible plastic material.

7. In a sap collecting system as defined in claim 3, wherein said second opposite end of said band mounted to said tubular conduit displays friction means thereon to provide anti-sliding of said band on said tubular conduit.

8. In a sap collecting system as defined in claim 3, wherein said band consists of a unitary body of flexible plastic material.

9. In a sap collecting system as defined in claim 4, wherein said second opposite end of said band mounted to said tubular conduit displays friction means thereon to provide anti-sliding of said band on said tubular conduit.

10. In a sap collecting system as defined in claim 4, wherein said band consists of a unitary body of flexible plastic material.

* * * * *